United States Patent
Stanhope et al.

(10) Patent No.: US 12,514,147 B2
(45) Date of Patent: Jan. 6, 2026

(54) SYSTEM AND METHOD FOR DETERMINING FIELD PLANTABILITY DURING PERFORMANCE OF A SEED-PLANTING OPERATION

(71) Applicant: CNH Industrial Canada, Ltd., Saskatoon (CA)

(72) Inventors: Trevor Stanhope, Oak Lawn, IL (US); Brittany Schroeder, Lowell, IN (US); Dennis George Thompson, Eagle Ridge (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 811 days.

(21) Appl. No.: 17/891,415

(22) Filed: Aug. 19, 2022

(65) Prior Publication Data
US 2024/0057509 A1    Feb. 22, 2024

(51) Int. Cl.
*A01B 79/02*    (2006.01)

(52) U.S. Cl.
CPC .................... *A01B 79/02* (2013.01)

(58) Field of Classification Search
CPC ....... A01B 79/00; A01B 79/005; A01B 79/02; A01C 21/005
See application file for complete search history.

(56) References Cited

U.S. PATENT DOCUMENTS

| | | | |
|---|---|---|---|
| 9,585,301 B1 | 3/2017 | Lund et al. | |
| 9,629,304 B2 | 4/2017 | Zielke | |
| 9,717,178 B1 | 8/2017 | Sauder et al. | |
| 9,864,094 B2 | 1/2018 | Stoller et al. | |
| 9,943,027 B2* | 4/2018 | Sauder | A01C 7/105 |
| 10,408,645 B2 | 9/2019 | Blank et al. | |
| 11,017,306 B2 | 5/2021 | Sood et al. | |
| 11,079,725 B2 | 8/2021 | Palla et al. | |
| 2018/0349520 A1 | 12/2018 | Bhalla et al. | |
| 2019/0150357 A1* | 5/2019 | Wu | H04N 7/188 |
| 2020/0390022 A1* | 12/2020 | Stanhope | G01C 7/04 |
| 2020/0390025 A1* | 12/2020 | Schoeny | A01B 79/005 |

(Continued)

OTHER PUBLICATIONS

Virk et al. "Row-Crop Planter Performance to Support Variable-Rate Seeding of Maize" Precision Agriculture (2020) 21:603-619 Published Online Oct. 3, 2019 (17 pages) https://link.springer.com/content/pdf/10.1007/s11119-019-09685-3.pdf.

*Primary Examiner* — Jamie L Mcgowan
(74) *Attorney, Agent, or Firm* — Dority & Manning, P.A.

(57) ABSTRACT

A system for determining field plantability during performance of a seed-planting operation with a seed-planting implement includes a soil moisture sensor configured to generate data indicative of a soil moisture content of a portion of the field. In this respect, a computing system is configured to determine a soil moisture content value of the portion of the field based on the data generated by the soil moisture sensor. Additionally, the computing system is configured to receive an input indicative of a soil composition parameter of the portion of the field and determine a soil composition parameter value of the portion of the field based on the received input. Moreover, the computing system is configured to determine a plantability index value for the portion of the field based on the determined soil moisture content value and the determined soil composition parameter value.

20 Claims, 5 Drawing Sheets

(56) References Cited

U.S. PATENT DOCUMENTS

| | | | |
|---|---|---|---|
| 2021/0026007 A1* | 1/2021 | Ferrari | G01N 33/246 |
| 2022/0000008 A1* | 1/2022 | Hubner | A01C 5/064 |
| 2022/0036070 A1* | 2/2022 | Yuan | G06N 3/084 |
| 2022/0132722 A1* | 5/2022 | Bomleny | G05D 1/0223 |
| | | | 701/41 |
| 2022/0132723 A1* | 5/2022 | Anderson | B60W 60/0011 |
| | | | 701/25 |
| 2023/0046844 A1* | 2/2023 | Anderson | A01B 79/02 |
| 2024/0057509 A1* | 2/2024 | Stanhope | G01N 33/246 |

* cited by examiner

SYSTEM AND METHOD FOR DETERMINING FIELD PLANTABILITY DURING PERFORMANCE OF A SEED-PLANTING OPERATION

FIELD OF THE INVENTION

The present disclosure generally relates to seed-planting implements and, more particularly, to systems and methods for determining field plantability during the performance of a seed-planting operation using a seed-planting implement.

BACKGROUND OF THE INVENTION

Modern farming practices strive to increase yields of agricultural fields. In this respect, seed-planting implements are towed behind a tractor or other work vehicle to disperse seed throughout a field. For example, many seed-planting implements include several laterally spaced row units, with each row unit forming a row of planted seeds within the field. In this respect, each row unit typically includes a furrow opening assembly (e.g., a disk opener(s)) that forms a furrow or trench in the soil. Furthermore, each row unit generally includes a seed-dispensing device (e.g., a seed meter and associated seed tube) that deposits the seeds into the furrow. After deposition of the seeds, a furrow closing assembly (e.g., a pair of closing disks or wheels) may close the furrow in the soil.

The plantability of the various portions of a field is an important parameter for optimizing the control of a seed-planting implement during a seed-planting operation. In general, the plantability of a portion of the field refers to the likelihood that seeds planted in that portion of the field will result in crops that produce a desired yield. Thus, portions of a field having high plantability are more likely to produce higher yields than portions of the field having low plantability. In respect, farmers may avoid planting seeds in areas of the field where there is low plantability and/or replant these areas at a later time. As such, systems and methods for determining the plantability of a field have been developed. While such systems and methods work well, further improvements are needed.

Accordingly, an improved system and method for determining field plantability would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a seed-planting implement including a frame and a furrow-forming tool supported on the frame, with the furrow-forming tool configured to form a furrow in the soil of a field as the seed-planting implement travels across the field to perform a seed-planting operation thereon. Furthermore, the seed-planting implement includes a soil moisture sensor configured to generate data indicative of a soil moisture content of a portion of the field and a computing system communicatively coupled to the soil moisture sensor. In this respect, the computing system is configured to determine a soil moisture content value of the portion of the field based on the data generated by the soil moisture sensor. Additionally, the computing system is configured to receive an input indicative of a soil composition parameter of the portion of the field and determine a soil composition parameter value of the portion of the field based on the received input. Moreover, the computing system is configured to determine a plantability index value for the portion of the field based on the determined soil moisture content value and the determined soil composition parameter value.

In another aspect, the present subject matter is directed to a system for determining field plantability during performance of a seed-planting operation with a seed-planting implement. The system includes a soil moisture sensor configured to generate data indicative of a soil moisture content of a portion of a field as the seed-planting implement travels across the field to perform the seed-planting operation thereon. Furthermore, the system includes a computing system communicatively coupled to the soil moisture sensor. In this respect, the computing system is configured to determine a soil moisture content value of the portion of the field based on the data generated by the soil moisture sensor. Additionally, the computing system is configured to receive an input indicative of a soil composition parameter of the portion of the field and determine a soil composition parameter value of the portion of the field based on the received input. Moreover, the computing system is configured to determine a plantability index value for the portion of the field based on the determined soil moisture content value and the determined soil composition parameter value.

In a further aspect, the present subject matter is directed to a method for determining field plantability during performance of a seed-planting operation with a seed-planting implement. The method includes receiving, with a computing system, soil moisture sensor data indicative of a soil moisture content of a portion of the field across which the seed-planting implement is traveling to perform the seed-planting operation. Furthermore, the method includes determining, with the computing system, a soil moisture content value of the portion of the field based on the received soil moisture sensor data. Additionally, the method includes receiving, with the computing system, an input indicative of a soil composition parameter of the portion of the field. Moreover, the method includes determining, with the computing system, a soil composition parameter value of the portion of the field based on the received input. In addition, the method includes determining, with the computing system, a plantability index value for the portion of the field based on the determined soil moisture content value and the determined soil composition parameter value. Furthermore, the method includes controlling, with the computing system, the operation of the seed-planting implement based on the determined plantability index.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
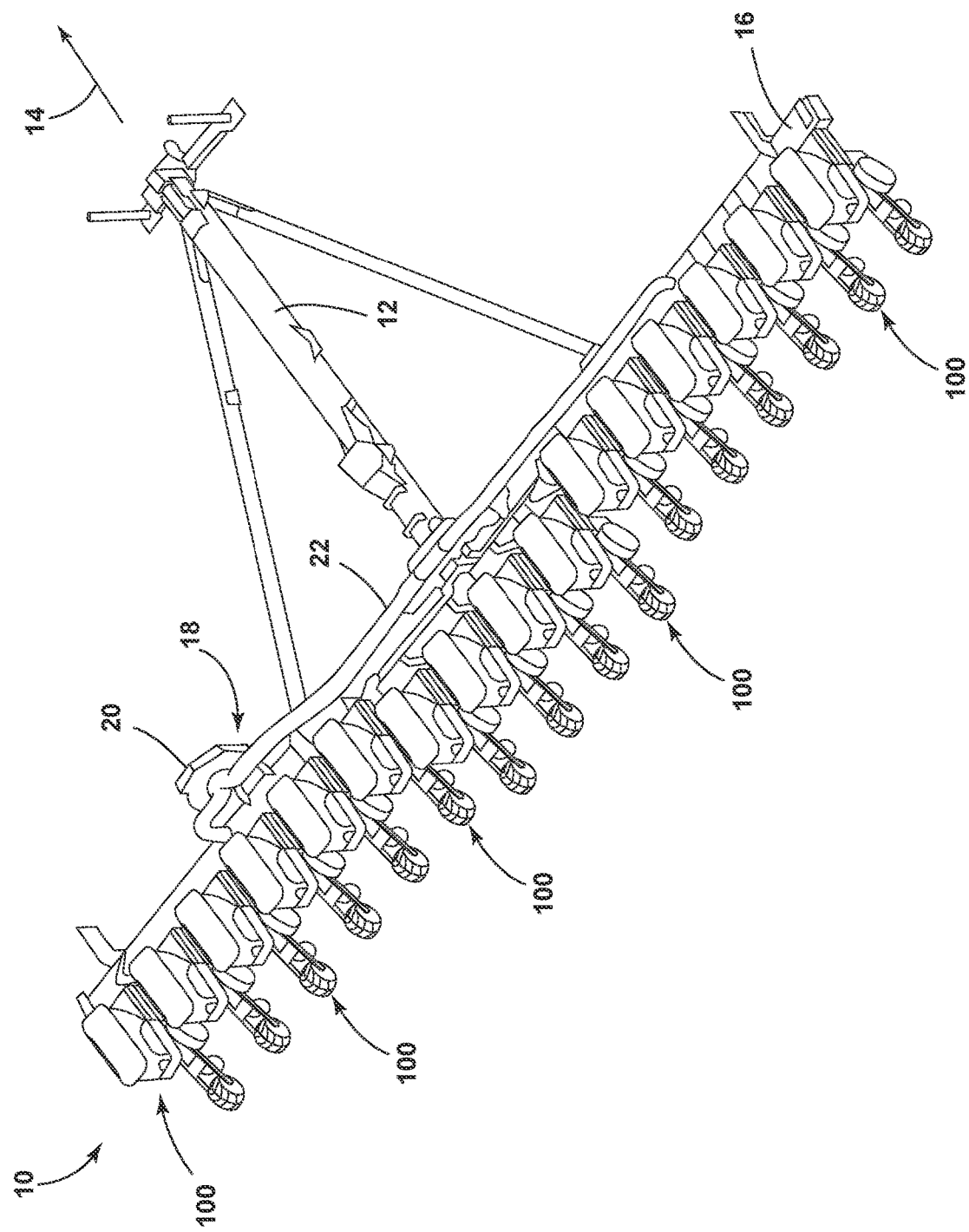
FIG. 1 illustrates a perspective view of one embodiment of a seed-planting implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to systems and methods for determining field plantability during the performance of a seed-planting operation with a seed-planting implement. Specifically, in several embodiments, a computing system of the disclosed system is configured to receive soil moisture sensor data indicative of the soil moisture content of a portion of the field across which the seed-planting implement is currently traveling to perform the seed-planting operation. In this respect, the computing system is configured to determine a soil moisture content value of the portion of the field based on the received soil moisture sensor data. Furthermore, the computing system is configured to receive an input (e.g., sensor data, an operator input, etc.) indicative of a soil composition parameter(s) of the portion of the field. Such soil composition parameter(s) may, in turn, correspond to the soil type, the soil texture, and/or the organic matter content of the portion of the field. Additionally, the computing system is configured to determine a soil composition parameter value(s) of the portion of the field based on the received input. Thereafter, the computing system is configured to determine a plantability index value for the portion of the field based on the determined soil moisture content and soil composition parameter values. In some embodiments, the computing system may control the operation of the seed-planting implement based on the determined plantability index value.

Determining the plantability index value for a portion of the field based on its soil moisture content and soil composition improves the operation of the seed-planting implement. More specifically, the plantability index value is indicative of the likelihood that seeds planted in that portion of the field will result in crops that produce a selected yield. For example, a portion of the field with a higher plantability index value is more likely to produce higher yields than a portion of the field with a lower plantability index value. Soil moisture content is an important factor in determining plantability of a portion of a field. That is, when the soil moisture is too high or too low, the plantability of the field may be low. However, the soil composition has an important effect on how the soil moisture content affects plantability. For example, soil composition greatly impacts how much and for how long the soil will retain moisture. As such, by using both soil moisture and soil composition, the disclosed system and method make more accurate determinations of field plantability. This, in turn, allows for improved control of the seed-planting implement and improved logistics management for the seed-planting operation, thereby maximizing crop yields and operational efficiency.

Referring now to the drawings, FIG. 1 illustrates a perspective view of one embodiment of a seed-planting implement 10. In the illustrated embodiment, the seed-planting implement 10 is configured as a planter. However, in alternative embodiments, the seed-planting implement 10 may generally correspond to any suitable seed-planting equipment or implement, such as seeder or another seed-dispensing implement.

As shown in FIG. 1, the seed-planting implement 10 includes a tow bar 12. In general, the tow bar 12 is configured to couple to a tractor or other agricultural vehicle (not shown), such as via a suitable hitch assembly (not shown). In this respect, the tractor may tow the seed-planting implement 10 across a field in a direction of travel (indicated by arrow 14) to perform a seed-planting operation on the field.

Furthermore, the seed-planting implement 10 includes a toolbar 16 coupled to the aft end of the tow bar 12. More specifically, the toolbar 16 is configured to support and/or couple to one or more components of the seed-planting implement 10. For example, the toolbar 16 is configured to support one or more seed-planting units or row units 100. As will be described below, each row unit 100 is configured to form a furrow having a selected depth within the soil of the field. Thereafter, each row unit 100 deposit seeds within the corresponding furrow and subsequently closes the corresponding furrow after the seeds have been deposited, thereby establishing rows of planted seeds.

In general, the seed-planting implement 10 may include any number of row units 100. For example, in the illustrated embodiment, the seed-planting implement 10 includes sixteen row units 100 coupled to the toolbar 16. However, in other embodiments, the seed-planting implement 10 may include six, eight, twelve, twenty-four, thirty-two, or thirty-six row units 100.

Additionally, in some embodiments, the seed-planting implement 10 includes a vacuum system 18. In general, the vacuum system 18 is configured to supply vacuum pressure to the individual row units 100. As such, the vacuum system 18 may include a fan or other pressurized air source 20 and a plurality of vacuum conduits 22 extending between the fan 20 and the row units 100. In this respect, the vacuum pressure generated by the fan 20 may be used to pick up seeds onto the seed meters (not shown) of the individual row units 100. However, the seeds may be provided to the row units 100 in any other suitable manner. For example, in some alternative embodiments, the seed meters may be pressure-based.

Figure 2:
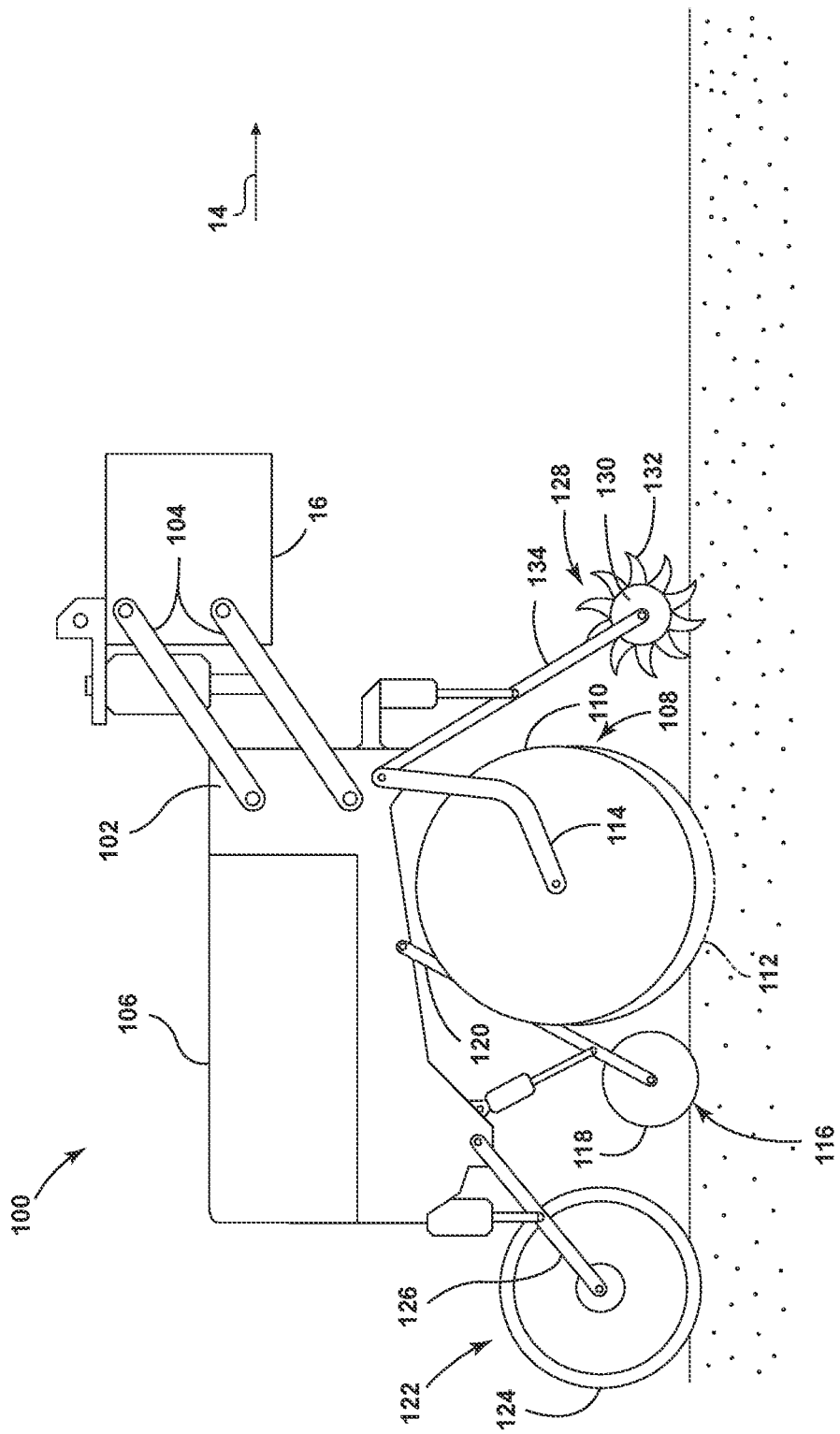
FIG. 2 illustrates a side view of one embodiment of a row unit of a seed-planting implement in accordance with aspects of the present subject matter.

FIG. 2 illustrates a side view of one embodiment of a row unit 100 of the seed-planting implement 10. As shown, the row unit 100 includes a row unit frame 102 adjustably coupled to the toolbar 16 by links 104. For example, one end of each link 104 may be pivotably coupled to the row unit frame 102, while the opposed end of each link 104 may be pivotably coupled to the toolbar 16. However, in alternative embodiments, the row unit 100 may be coupled to the toolbar 16 in any other suitable manner. Furthermore, a hopper 106 may be coupled to or otherwise supported on the row unit frame 102 and configured to store seeds (e.g., that are received from a bulk storage tank or filled individually).

Moreover, the row unit 100 also includes a furrow opening assembly 108. For example, in one embodiment, the furrow opening assembly 108 may include a gauge wheel 110 and a furrow-forming tool, such as one or more disk openers 112, which is configured to excavate a furrow or trench in the soil. In general, the gauge wheel 110 is configured to engage the top surface of the soil as the implement 10 is moved across the field. As such, the height of the disk opener(s) 112 may be adjusted with respect to the position of the gauge wheel 110 to set the depth of the furrow being excavated. Furthermore, the furrow opening assembly 108 may include a support arm 114 configured to adjustably couple the gauge wheel 110 to the row unit frame 102. For example, one end of the support arm 114 may be rotatably coupled to the gauge wheel 110, while an opposed end of the support arm 114 may be pivotably coupled to the row unit frame 102. Additionally, the disk opener(s) 112 may be rotatably coupled (e.g., bolted) to the row unit frame 102. However, in alternative embodiments, the gauge wheel 110 and the disk opener(s) 112 may be coupled to the row unit frame 102 in any other suitable manner. In addition, in other embodiments, the furrow opening assembly 108 may include any other suitable type of furrow-forming tools, such as a hoe(s).

Furthermore, the row unit 100 may include a furrow closing assembly 116. Specifically, in several embodiments, the furrow closing assembly 116 may include a pair of closing disks 118 (only one of which is shown) positioned relative to each other to permit soil to flow between the disks 118 as the implement 10 travels across the field. In this regard, the closing disks 118 are configured to close the furrow after seeds have been deposited therein, such as by collapsing the excavated soil into the furrow. Moreover, the furrow closing assembly 116 may include a support arm 120 configured to adjustably couple the closing disks 118 to the row unit frame 102. For example, one end of the support arm 120 may be rotatably coupled to the closing disks 118, while the opposed end of the support arm 120 may be pivotably coupled to the row unit frame 102. However, in alternative embodiments, the closing disks 118 may be coupled to the row unit frame 102 in any other suitable manner. Moreover, in alternative embodiments, the furrow closing assembly 116 may include any other suitable components for closing the furrow, such as a pair of closing wheels (not shown). Furthermore, in some embodiments, the row unit 100 may not include the furrow closing assembly 116.

Additionally, the row unit 100 may include a press wheel assembly 122. Specifically, in several embodiments, the press wheel assembly 122 may include a press wheel 124 configured to roll over the closed furrow to firm the soil over the seed and promote favorable seed-to-soil contact. In embodiments in which the row unit 100 does not include the furrow closing assembly 116, the press wheel assembly 122 may close the furrow after seeds have been deposited therein. Furthermore, the press wheel assembly 122 may include a support arm 126 configured to adjustably couple the press wheel 124 to the row unit frame 102. For example, one end of the support arm 126 may be rotatably coupled to the press wheel 124, while the opposed end of the support arm 126 may be pivotably coupled to the row unit frame 102. However, in alternative embodiments, the press wheel 124 may be coupled to the row unit frame 102 in any other suitable manner. Moreover, in some embodiments, the row unit 100 may not include the press wheel assembly 122.

Furthermore, the row unit 100 includes a row cleaner assembly 128 positioned forward of the disk opener(s) 112 relative to the direction of travel 14. In this regard, the row cleaner assembly 128 may be configured to break up and/or sweep away residue, dirt clods, trash, and/or other debris from path of the row unit 100 before the furrow is formed in the soil. For example, in one embodiment, the row cleaner assembly 128 may include one or more row cleaner wheels 130, with each wheel 130 having a plurality of tillage points or fingers 132. As such, the row cleaner wheel(s) 130 may be positioned relative to the soil surface such that the wheel(s) 130 roll relative to the field as the implement 10 travels across the field, thereby allowing the fingers 132 to break up and/or sweep away residue, dirt clods, trash, and/or other debris. Additionally, the row cleaner assembly 128 may include a row cleaner arm 134 configured to adjustably couple the row cleaner wheel(s) 130 to the row unit frame 102. For example, one end of the row cleaner arm 134 may be rotatably coupled to the row cleaner wheel(s) 130, while an opposed end of the row cleaner arm 134 may be pivotably coupled to the row unit frame 102.

The configuration of the seed-planting implement 10 described above and shown in FIGS. 1 and 2 is provided only to place the present subject matter in an exemplary field of use. Thus, the present subject matter may be readily adaptable to any manner of seed-planting implement configuration.

Figure 3:
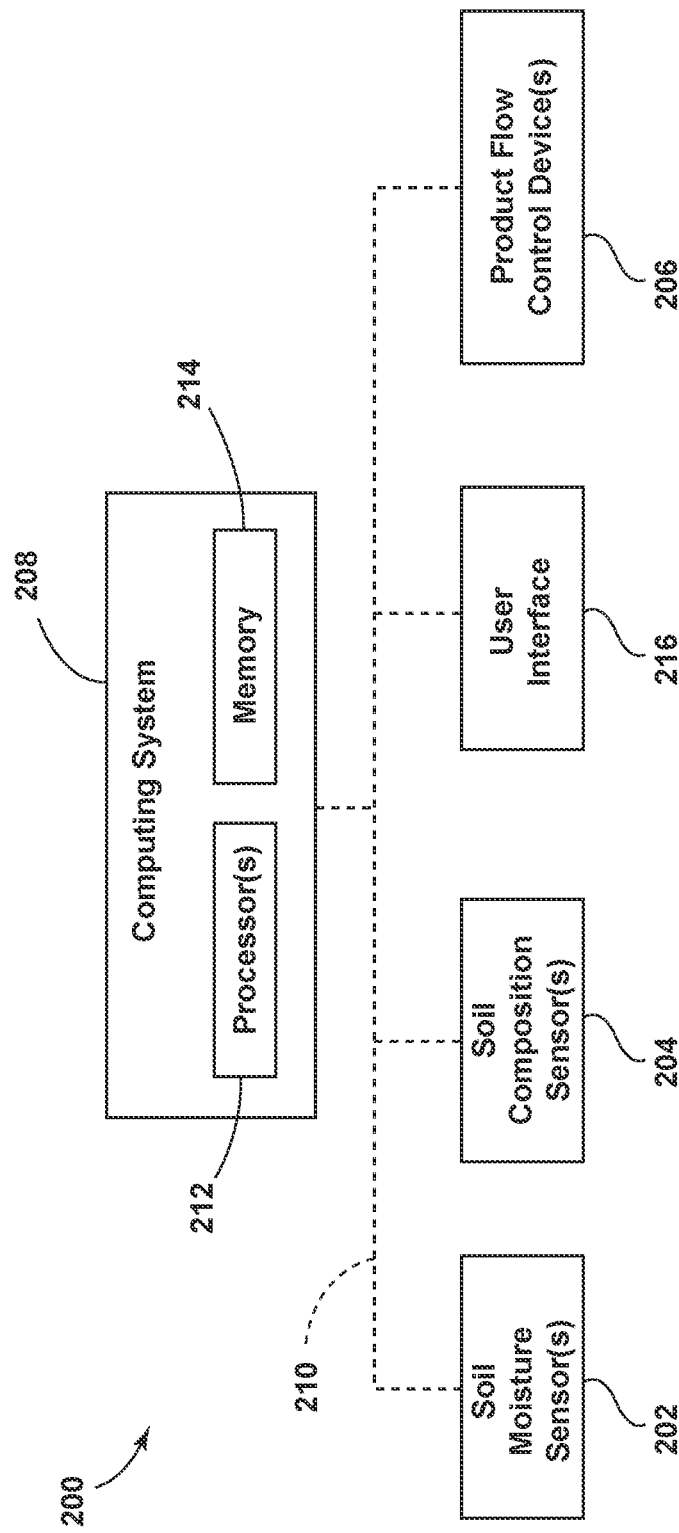
FIG. 3 illustrates a schematic view of one embodiment of a system for determining field plantability during performance of a seed-planting operation with a seed-planting implement in accordance with aspects of the present subject matter.

Referring now to FIG. 3, a schematic view of one embodiment of a system 200 for determining field plantability during performance of a seed-planting operation with a seed-planting implement is illustrated in accordance with aspects of the present subject matter. In general, the system 200 will be described herein with reference to the seed-planting implement 10 described above with reference to FIGS. 1 and 2. However, it should be appreciated by those of ordinary skill in the art that the disclosed system 200 may generally be utilized with seed-planting implements having any other suitable implement configuration.

As shown in FIG. 3, the system 200 includes one or more soil moisture sensors 202 coupled to or otherwise mounted onto the seed-planting implement 10 and/or an associated work vehicle (not shown). In general, the soil moisture sensor(s) 202 is configured to capture data indicative of the soil moisture content of a portion(s) of the field across which the seed-planting implement 10 is currently traveling. For example, in one embodiment, the soil moisture sensor(s) 202 may be configured as an optical sensor(s) configured to detect one or more characteristics of light reflected by the soil, with such characteristics generally being indicative of the soil moisture content. However, in alternative embodiments, the soil moisture sensor(s) 202 may be configured as any other suitable device(s) for sensing or detecting the soil moisture content of the field.

The system 200 may include any suitable number of soil moisture sensors 202. For example, in one embodiment, the system 200 may include one soil moisture sensor 202 mounted on each row unit 100 of the seed-planting implement 10. In alternative embodiments, the system 200 may include a single soil moisture sensor 202 mounted on the seed-planting implement 10 and/or an associated work vehicle (not shown).

Furthermore, the system 200 includes one or more soil composition sensors 204 coupled to or otherwise mounted onto the seed-planting implement 10 and/or the associated work vehicle. In general, the soil composition sensor(s) 204 is configured to capture data indicative of the soil composition (e.g., soil type, soil texture, organic matter content, etc.) of the portion(s) of the field across which the seed-planting implement 10 is currently traveling. For example, in one embodiment, the soil composition sensor(s) 204 may be configured as a vision-based sensor(s), such as a camera(s), an optical sensor(s), or the like, which is configured to detect one or more visual or optical characteristics of the soil, with such characteristics generally being indicative of the soil composition. However, in alternative embodiments, the soil composition sensor(s) 204 may be configured as any other suitable device(s) for sensing or detecting the soil composition of the field, such as a RADAR sensor or other ground-penetrating sensor.

The system 200 may include any suitable number of soil composition sensors 204. For example, in one embodiment, the system 200 may include one soil moisture sensor 202 mounted on each row unit 100 of the seed-planting implement 10. In alternative embodiments, the system 200 may include a single soil composition sensor 204 mounted on the seed-planting implement 10 and/or an associated work vehicle (not shown).

Additionally, the system 200 may include one or more product flow control devices 206 of the seed-planting implement 10. In general, the product flow control device(s) 206 is configured to control the flow of agricultural products, such as the seeds, from the various hoppers and storage tanks (e.g., the hoppers 106) of the implement 10 to the seed tubes or other product dispensing devices (not shown) of the implement 10. For example, the product flow control device(s) 206 may correspond to a seed meter(s), a valve(s), an actuator(s), a fan(s), and/or other like devices that generate and control the flow of the product through the implement 10. As such, by controlling the operation of the product flow control device(s) 206, the dispensing of the seeds or, more generally, the seed-planting operation can be selectively turned on and off.

Moreover, the system 200 includes a computing system 208 communicatively coupled to one or more components of the seed-planting implement 10 and/or the system 200 to allow the operation of such components to be electronically or automatically controlled by the computing system 208. For instance, the computing system 208 may be communicatively coupled to the sensors 202, 204 via a communicative link 210. As such, the computing system 208 may be configured to receive data from the sensors 202, 204 that is indicative of various characteristics of the field across which the implement 10 is traveling. Furthermore, the computing system 208 may be communicatively coupled to the product flow control device(s) 206 via the communicative link 210. In this respect, the computing system 208 may be configured to control the operation of the product flow control device(s) 206 to selectively turn the seed-planting operation on and off. In addition, the computing system 208 may be communicatively coupled to any other suitable components of the implement 10 and/or the system 200.

In general, the computing system 208 may comprise one or more processor-based devices, such as a given controller or computing device or any suitable combination of controllers or computing devices. Thus, in several embodiments, the computing system 208 may include one or more processor(s) 212 and associated memory device(s) 214 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 214 of the computing system 208 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 214 may generally be configured to store suitable computer-readable instructions that, when implemented by the processor(s) 212, configure the computing system 208 to perform various computer-implemented functions, such as one or more aspects of the methods and algorithms that will be described herein. In addition, the computing system 208 may also include various other suitable components, such as a communications circuit or module, one or more input/output channels, a data/control bus and/or the like.

The various functions of the computing system 208 may be performed by a single processor-based device or may be distributed across any number of processor-based devices, in which instance such devices may be considered to form part of the computing system 208. For instance, the functions of the computing system 208 may be distributed across multiple application-specific controllers or computing devices, such as a navigation controller, an engine controller, a transmission controller, an implement controller, and/or the like.

Furthermore, the system 200 may also include a user interface 216. More specifically, the user interface 216 may be configured to receive inputs (e.g., inputs associated with the soil composition of the field) from the operator. As such, the user interface 216 may include one or more input devices, such as touchscreens, keypads, touchpads, knobs, buttons, sliders, switches, mice, microphones, and/or the like, which are configured to receive inputs from the operator. The user interface 216 may, in turn, be communicatively coupled to the computing system 208 via the communicative link 210 to permit the received inputs to be transmitted from the user interface 216 to the computing system 208. In addition, some embodiments of the user interface 216 may include one or more feedback devices (not shown), such as display screens, speakers, warning lights, and/or the like, which are configured to provide feedback from the computing system 208 to the operator. In one embodiment, the user interface 216 may be mounted or otherwise positioned within a cab (not shown) of a work vehicle (not shown) configured to tow the implement 10 across the field. However, in alternative embodiments, the user interface 216 may be mounted at any other suitable location.

Figure 4:
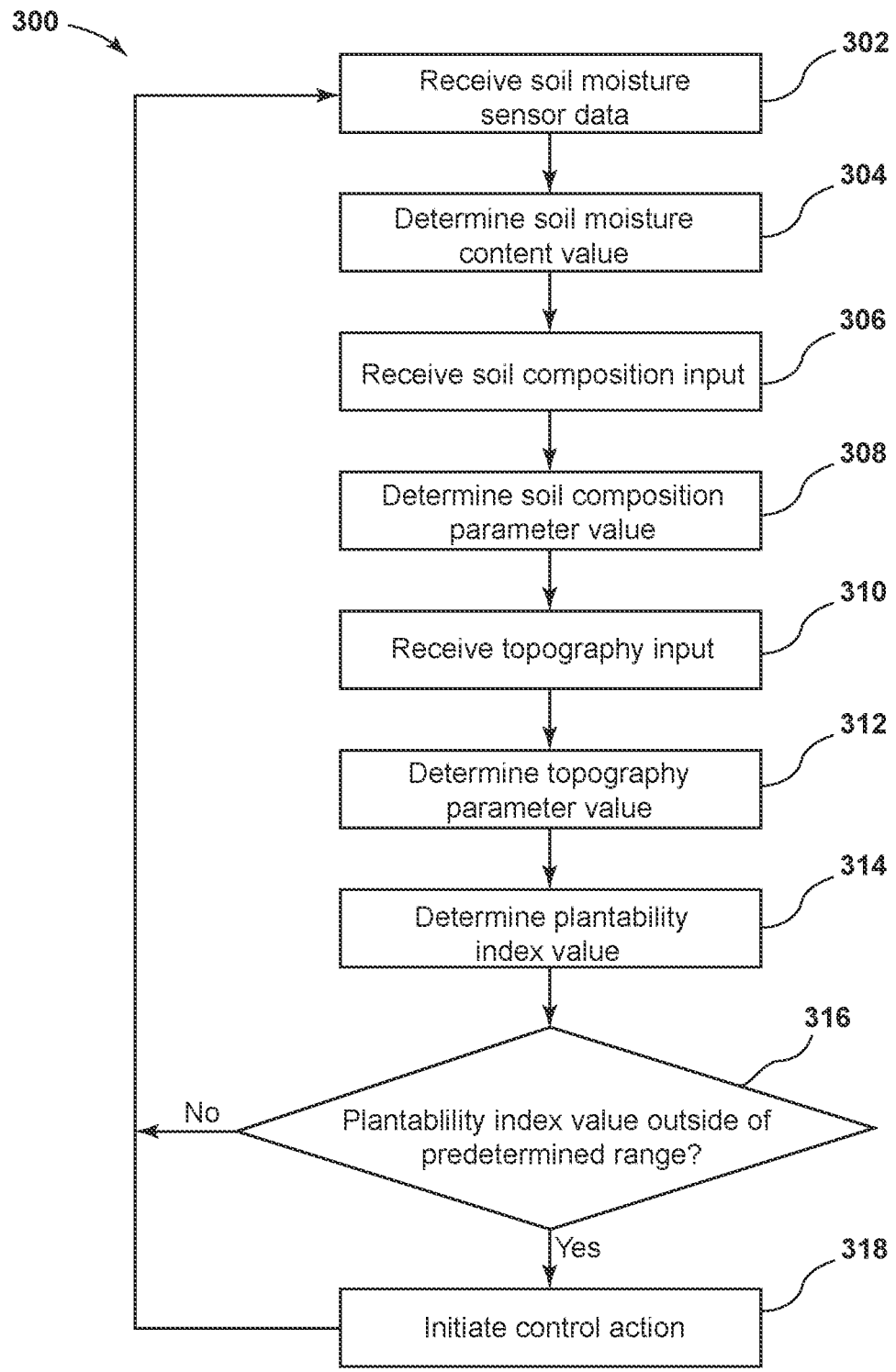
FIG. 4 illustrates a flow diagram providing one embodiment of control logic for determining field plantability during performance of a seed-planting operation with a seed-planting implement in accordance with aspects of the present subject matter.

Referring now to FIG. 4, a flow diagram of one embodiment of control logic 300 that may be executed by the computing system 208 (or any other suitable computing system) for determining field plantability during performance of a seed-planting operation with a seed-planting implement is illustrated in accordance with aspects of the present subject matter. Specifically, the control logic 300 shown in FIG. 4 is representative of steps of one embodiment of an algorithm that can be executed to determine field plantability during performance of a seed-planting operation with a seed-planting implement more accurately, thereby improving the effectiveness of the seed-planting implement and the efficiency of the seed-planting operation. Thus, in several embodiments, the control logic 300 may be advantageously utilized in association with a system installed on or forming part of a seed-planting implement to allow for real-time determination field plantability without requiring substantial computing resources and/or processing time. However, in other embodiments, the control logic 300 may be used in association with any other suitable system, application, and/or the like for determining field plantability during performance of a seed-planting operation with a seed-planting implement.

As shown in FIG. 4, at (302), the control logic 300 includes receiving soil moisture sensor data indicative of the soil moisture content of a portion of a field. Specifically, as mentioned above, in several embodiments, the computing system 208 may be communicatively coupled to the soil moisture sensor(s) 202 via the communicative link 210. In this respect, as the seed-planting implement 10 travels across a field to perform the seed-planting operation, the computing system 208 may be configured to receive data from the soil moisture sensor(s) 202. Such data may, in turn, be indicative of the soil moisture content of a portion of the field.

Furthermore, at (304), the control logic 300 includes determining a soil moisture content value of the portion of the field based on the received soil moisture sensor data. Specifically, in several embodiments, the computing system 208 may be configured to analyze or otherwise process the soil moisture data received at (302) to determine a soil moisture content value of the portion of the field. For example, in one embodiment, the computing system 208 may access a suitable look-up table(s) stored in its memory device(s) 214 correlating the received sensor data to the soil moisture content value.

Additionally, at (306), the control logic 300 includes receiving an input indicative of a soil composition parameter of the portion of the field. Specifically, as mentioned above, in several embodiments, the computing system 208 may be communicatively coupled to the soil composition sensor(s) 204 via the communicative link 210. In this respect, as the seed-planting implement 10 travels across the field to perform the seed-planting operation, the computing system 208 may be configured to receive data from the soil composition sensor(s) 204. Such data may, in turn, be indicative of the soil composition of the portion of the field.

In alternative embodiments, at (306), the soil composition input may be received from the operator of the implement 10. Specifically, as mentioned above, in such embodiments, the computing system 208 may be communicatively coupled to the user interface 216 via the communicative link 210. In this respect, before beginning the seed-planting operation, the operator may input the soil composition(s) of the field into the user interface 216. Thereafter, the computing system 208 may be configured to receive the input from the user interface 216. Such input may, in turn, be indicative of the soil composition of the portion of the field.

Moreover, at (308), the control logic 300 includes determining a soil composition value of the portion of the field based on the received soil composition input. Specifically, in several embodiments, the computing system 208 may be configured to analyze or otherwise process the soil composition input received at (306) to determine a soil composition value(s) of the portion of the field. For example, in one embodiment, the computing system 208 may access a suitable look-up table(s) stored in its memory device(s) 214 correlating the received sensor data to the soil composition value(s).

The soil composition value(s) determined at (308) may correspond to any suitable parameter value(s) associated with the composition of the soil within the portion of the field. For example, in some embodiments, the soil composition value(s) may include value(s) indicative of the type of the soil within the portion of the field. Additionally, or alternatively, the soil composition value(s) may include value(s) indicative of the texture of the soil within the portion of the field. Additionally, or alternatively, the soil composition value(s) may include value(s) indicative of the organic matter content of the soil within the portion of the field.

In addition, at (310), the control logic includes receiving an input indicative of a topography parameter of the portion of the field. Specifically, in several embodiments, as the seed-planting implement 10 travels across the field to perform the seed-planting operation, the computing system 208 may be configured to access a topographical map of the field stored within its memory device(s) 214. Such map may, in turn, be indicative of the topography of the portion of the field. Alternatively, the computing system 208 may receive a topography input(s) from a topography sensor(s) (not shown), such an accelerometer, an inclinometer, an IMU, a LiDAR sensor, and/or the like.

As shown in FIG. 4, at (312), the control logic 300 includes determining a topography parameter value of the portion of the field based on the received topography parameter input. Specifically, in several embodiments, the computing system 208 may be configured to analyze or otherwise process the topography input received at (310) to determine a topography value(s) of the portion of the field. For example, in one embodiment, the computing system 208 may determine the current location of the implement 10 within the field (e.g., using a GNSS-based receiver (not shown)) and then analyze the accessed topography map to determine the topography parameter(s) at the current location of the implement 10. In some embodiments, (310) and (312) may be omitted.

The topography parameter value(s) determined at (312) may correspond to any suitable parameter value(s) associated with the topography of the portion of the field. For example, in some embodiments, the topography value(s) may include a value(s) indicative of the slope or orientation (e.g., the angle) of the portion of the field. Additionally, or alternatively, the soil composition value(s) may include a value(s) indicative of the elevation of the portion of the field.

Furthermore, at (314), the control logic 300 includes determining a plantability index value for the portion of the field based on the determined soil moisture content value and the determined soil composition parameter value. Specifically, in several embodiments, the computing system 208 is configured to determine a plantability index value for the portion of the field based on the soil moisture content value determined at (304) and the soil composition parameter value(s) determined at (308). For example, in one embodiment, the computing system 208 may access a suitable look-up table(s) stored in its memory device(s) 214 correlating the determined soil moisture and soil composition values to the plantability index value.

In general, the plantability index value is indicative of the likelihood that seeds planted in that portion of the field will result in crops that produce a selected yield. That is, the plantability index value provides a single value based on several parameters of a portion of the field that is indicative of the likelihood of success of planting seeds in that portion of the field. Thus, a portion of the field with a higher plantability index value is more likely to produce higher yields than a portion of the field with a lower plantability index value. For example, in one embodiment, the plantability index value may correspond to an integer value between one and one hundred, with a value of one indicating an extremely low likelihood of generating the selected yield and a value of one hundred indicating an extremely high likelihood of generating the selected yield. However, the plantability index values may correspond to any other suitable range of numerical values. As will be described below, the determined plantability index value may be used to adjust or otherwise control the operation of the seed-planting implement 10 during the seed-planting operation.

Determining the plantability index value for the portion of the field based on the soil moisture content determined at (304) and the soil composition determined at (308) improves the operation of the seed-planting implement 10 and efficiency of the seed-planting operation being performed by the implement 10. More specifically, soil moisture content is an important factor in determining the plantability of a portion of a field. That is, when the soil moisture is too high or too low, the plantability of the field may be low. However, the soil composition has an important effect on how the soil moisture content affects plantability. Specifically, soil composition greatly impacts how much and for how long soil will retain moisture. For example, the plantability of a portion of the field having acceptable soil moisture may suffer when the soil composition allows for the quick drying of the soil. As such, by using both soil moisture and soil composition, the disclosed system and method make more accurate determinations of field plantability. This, in turn, allows for improved control of the seed-planting implement 10 and improved logistics management for the seed-planting operation, thereby maximizing crop yields and operational efficiency.

In some embodiments, at (314), the plantability index value may be determined for the portion of the field based on the determined topography parameter in addition to the soil moisture content and soil composition parameter values. Specifically, in such embodiments, the computing system 208 is configured to determine the plantability index value for the portion of the field based on the topography parameter(s) determined at (312) in addition to the soil moisture content value determined at (304) and the soil composition parameter value(s) determined at (308). For example, in one embodiment, the computing system 208 may access a suitable look-up table(s) stored in its memory device(s) 214 correlating the determined soil moisture, soil composition, and topography values to the plantability index value. The topography of the field further effects how the soil moisture content affects plantability. As such, by using topography in addition to soil moisture and soil composition, the accuracy of the field plantability determinations may be further improved.

Additionally, at (316), the control logic 300 includes comparing the determined plantability index value for the portion of the field to a predetermined range. Specifically, in several embodiments, the computing system 208 is configured to compare the plantability index value for the portion of the field determined at (314) to a predetermined range. When the determined plantability index value is within the predetermined range (thereby indicating that the portion of the field across which the implement 10 is currently traveling is of acceptable plantability), the control logic 300 returns to (302). Conversely, when the determined plantability index value falls outside of the predetermined range (thereby indicating that the portion of the field across which the implement 10 is currently traveling is of low plantability), the control logic 300 proceeds to (318).

Moreover, at (318), the control logic 300 includes initiating a control action when the determined plantability index value for the portion of the field falls outside of the predetermined range. Specifically, in several embodiments, when it is determined at (316) that the plantability index value for the portion of the field has fallen outside of the predetermined range, the computing system 208 may be configured to initiate one or more control actions. Such control action(s) may generally be configured to address the low plantability of the current portion of the field. For example, in one embodiment, such control action(s) may include providing a notification to the operator of the seed-planting implement 10 (e.g., via the user interface 216) that the determined plantability index value for the portion of the field has fallen outside of the predetermined range. Thereafter, the operator can perform any corrective action(s) that he/she sees fit.

In addition, at (318), in some embodiments, the control action(s) may include actively controlling the operation of the seed-planting implement 10 and/or the associated work vehicle (not shown). For example, in one embodiment, the control action(s) may include halting the seed-planting operation. Specifically, in such an embodiment, when the determined plantability index value for the portion of the field has fallen outside of the predetermined range, the computing system 208 may control the operation of the product flow control device(s) 206 to halt the seed-planting operation. This, in turn, prevents seeds from being planted in portions of the field in which there is low plantability. Additionally, the control action(s) may include adjusting a guidance line associated with the seed-planting implement 10. Specifically, in such an embodiment, when the determined plantability index value for the portion of the field has fallen outside of the predetermined range, the computing system 208 may adjust a guidance line being followed by the implement 10. This, in turn, allows the implement 10 to avoid areas of the field with low plantability. Moreover, areas of the field where the seed-planting operation was halted or that were avoided all together may be flagged for later reprocessing by the implement 10, such as when the plantability index improves (e.g., due to drying of the soil). However, in alternative embodiments, any other suitable control action(s) may be initiated in addition to or in lieu of providing a notification, halting the seed-planting operation, and/or adjusting the guidance line. For example, in one such embodiment, areas of the field where the seed-planting operation was halted or that were avoided all together may be flagged for a different operation, such as watering with irrigation systems.

Furthermore, in some embodiments, the computing system 208 may be further configured to generate a field map identifying the plantability index value at a plurality of locations within the field. Specifically, in such embodiments, the computing system 208 may correlate the plantability index values determined at (314) to a location within the field (e.g., as determined based on data received from a GNSS-based receiver (not shown)). Thereafter, the computing system 208 generate a field map identifying the plantability index value at each location within the field for which a plantability index value was determined.

Figure 5:
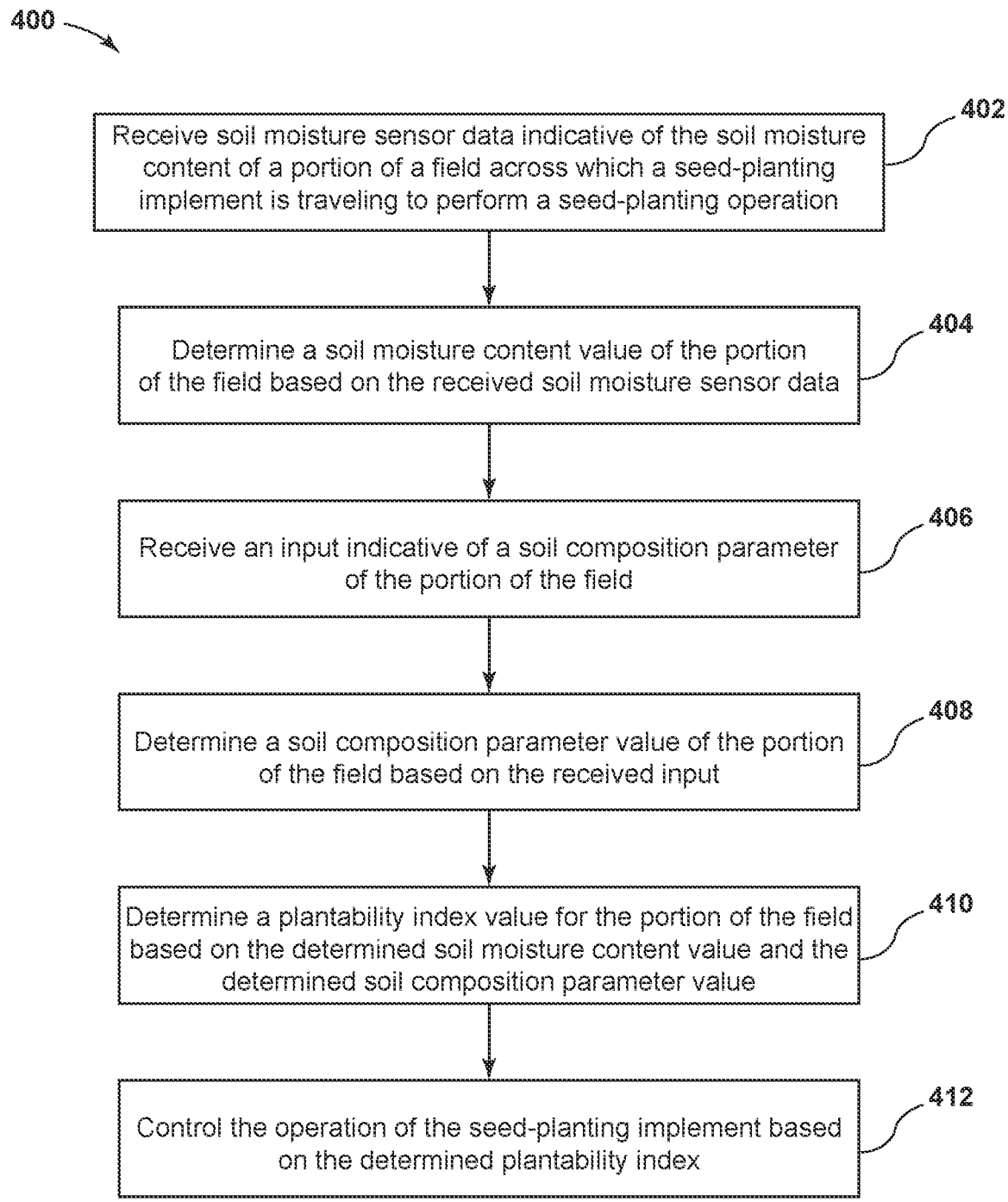
FIG. 5 illustrates a flow diagram of one embodiment of a method for determining field plantability during performance of a seed-planting operation with a seed-planting implement in accordance with aspects of the present subject matter.

Referring now to FIG. 5, a flow diagram of one embodiment of a method 400 for determining field plantability during performance of a seed-planting operation with a seed-planting implement is illustrated in accordance with aspects of the present subject matter. In general, the method 400 will be described herein with reference to the seed-planting implement 10 and the system 200 described above with reference to FIGS. 1-4. However, it should be appreciated by those of ordinary skill in the art that the disclosed method 400 may generally be implemented with any seed-planting implement having any suitable implement configuration and/or within any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (402), the method 400 includes receiving, with a computing system, soil moisture sensor data indicative of the soil moisture content of a portion of a field across which a seed-planting implement is traveling to perform a seed-planting operation. For instance, as described above, the computing system 208 may be configured to receive soil moisture sensor data from the soil moisture sensor(s) 202. Such sensor data is, in turn, indicative of the soil moisture content of a portion of the field across which the seed-planting implement 10 is traveling to perform the seed-planting operation.

Furthermore, at (404), the method 400 includes determining, with the computing system, a soil moisture content value of the portion of the field based on the received soil moisture sensor data. For instance, as described above, the computing system 208 may be configured to determine a soil moisture content value of the portion of the field based on the received soil moisture sensor data.

Additionally, as shown in FIG. 5, at (406), the method 400 includes receiving, with the computing system, an input indicative of a soil composition parameter of the portion of the field. For instance, as described above, the computing system 208 may be configured to receive an input indicative of a soil composition parameter of the portion of the field from the soil composition sensor(s) 204 or the user interface 216.

Moreover, at (408), the method 400 includes determining, with the computing system, a soil composition parameter value of the portion of the field based on the received input. For instance, as described above, the computing system 208 may be configured to determine a soil composition parameter value of the portion of the field based on the received input.

In addition, as shown in FIG. 5, at (410), the method 400 includes determining, with the computing system, a plantability index value for the portion of the field based on the determined soil moisture content value and the determined soil composition parameter value. For instance, as described above, the computing system 208 may be configured to determine a plantability index value for the portion of the field based on the determined soil moisture content value and the determined soil composition parameter value.

Furthermore, at (412), the method 400 includes controlling, with the computing system, the operation of the seed-planting implement based on the determined plantability index. For instance, as described above, the computing system 208 may be configured to control the operation of the seed-planting implement 10 (e.g., its product flow control device(s) 206) based on the determined plantability index.

It is to be understood that the steps of the control logic 300 and the method 400 are performed by the computing system 208 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 208 described herein, such as the control logic 300 and the method 400, is implemented in software code or instructions which are tangibly stored on a tangible computer readable medium. The computing system 208 loads the software code or instructions via a direct interface with the computer readable medium or via a wired and/or wireless network. Upon loading and executing such software code or instructions by the computing system 208, the computing system 208 may perform any of the functionality of the computing system 208 described herein, including any steps of the control logic 300 and the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A seed-planting implement, comprising:
   a frame;
   a furrow-forming tool supported on the frame, the furrow-forming tool configured to form a furrow in soil of a field as the seed-planting implement travels across the field to perform a seed-planting operation thereon;
   a soil moisture sensor configured to generate data indicative of a soil moisture content of a portion of the field; and
   a computing system communicatively coupled to the soil moisture sensor, the computing system configured to:
      determine a soil moisture content value of the portion of the field based on the data generated by the soil moisture sensor;
      receive an input indicative of a soil composition parameter of the portion of the field;
      determine a soil composition parameter value of the portion of the field based on the received input; and determine a plantability index value for the portion of the field based on the determined soil moisture content value and the determined soil composition parameter value.

2. The seed-planting implement of claim 1, wherein the soil composition parameter of the portion of the field comprises at least one of a soil type, a soil texture, or an organic matter content of the portion of the field.

3. The seed-planting implement of claim 1, further comprising:
a soil composition sensor configured to generate data indicative of the soil composition parameter of the portion of the field, the soil composition sensor being communicatively coupled to the computing system,
wherein, when receiving the input, the computing system is configured to receive the input indicative of the soil composition parameter of the portion of the field from the soil composition sensor.

4. The seed-planting implement of claim 1, wherein, when receiving the input, the computing system is configured to receive the input indicative of the soil composition parameter of the portion of the field from a user interface associated with the seed-planting implement.

5. The seed-planting implement of claim 1, wherein the computing system is further configured to control an operation of the seed-planting implement based on the determined plantability index value.

6. A system for determining field plantability during performance of a seed-planting operation with a seed-planting implement, the system comprising:
a soil moisture sensor configured to generate data indicative of a soil moisture content of a portion of a field as the seed-planting implement travels across the field to perform the seed-planting operation thereon; and
a computing system communicatively coupled to the soil moisture sensor, the computing system configured to:
determine a soil moisture content value of the portion of the field based on the data generated by the soil moisture sensor;
receive an input indicative of a soil composition parameter of the portion of the field;
determine a soil composition parameter value of the portion of the field based on the received input; and
determine a plantability index value for the portion of the field based on the determined soil moisture content value and the determined soil composition parameter value.

7. The system of claim 6, wherein the soil composition parameter of the portion of the field comprises at least one of a soil type, a soil texture, or an organic matter content of the portion of the field.

8. The system of claim 6, further comprising:
a soil composition sensor configured to generate data indicative of the soil composition parameter of the portion of the field, the soil composition parameter being communicatively coupled to the computing system,
wherein, when receiving the input, the computing system is configured to receive the input indicative of the soil composition parameter of the portion of the field from the soil composition sensor.

9. The system of claim 6, wherein, when receiving the input, the computing system is configured to receive the input indicative of the soil composition parameter of the portion of the field from a user interface associated with the seed-planting implement.

10. The system of claim 6, wherein the computing system is further configured to control an operation of the seed-planting implement based on the determined plantability index value.

11. The system of claim 6, wherein the computing system is further configured to:
compare the determined plantability index value for the portion of the field to a predetermined range; and
initiate a control action when the determined plantability index value for the portion of the field falls outside of the predetermined range.

12. The system of claim 11, wherein the control action comprises providing a notification to an operator of the seed-planting implement that the determined plantability index value for the portion of the field has fallen outside of the predetermined range.

13. The system of claim 11, wherein the control action comprises halting the seed-planting operation.

14. The system of claim 11, wherein the control action comprises adjusting a guidance line associated with the seed-planting implement.

15. The system of claim 6, wherein the computing system is further configured to:
receive an input indicative of a topography parameter of the portion of the field;
determine a topography parameter value of the portion of the field based on the received input; and
determine the plantability index value for the portion of the field based on the determined topography parameter value in addition to the determined soil moisture content value and the determined soil composition parameter value.

16. The system of claim 6, wherein the computing system is further configured to generate a field map identifying the plantability index value at a plurality of locations within the field.

17. A method for determining field plantability during performance of a seed-planting operation with a seed-planting implement, the method comprising:
receiving, with a computing system, soil moisture sensor data indicative of a soil moisture content of a portion of the field across which the seed-planting implement is traveling to perform the seed-planting operation;
determining, with the computing system, a soil moisture content value of the portion of the field based on the received soil moisture sensor data;
receiving, with the computing system, an input indicative of a soil composition parameter of the portion of the field;
determining, with the computing system, a soil composition parameter value of the portion of the field based on the received input;
determining, with the computing system, a plantability index value for the portion of the field based on the determined soil moisture content value and the determined soil composition parameter value; and
controlling, with the computing system, the operation of the seed-planting implement based on the determined plantability index.

18. The method of claim 17, wherein the soil composition parameter of the portion of the field comprises at least one of a soil type, a soil texture, or an organic matter content of the portion of the field.

19. The method of claim 17, wherein controlling the operation of the seed-planting implement comprises:

comparing, with the computing system, the determined plantability index value for the portion of the field to a predetermined range; and initiating, with the computing system, a control action when the determined plantability index value for the portion of the field falls outside of the predetermined range.

20. The method of claim 19, wherein the control action comprises adjusting a guidance line associated with seed-planting implement.

* * * * *